US006414079B1

(12) United States Patent
Schafheutle et al.

(10) Patent No.: US 6,414,079 B1
(45) Date of Patent: Jul. 2, 2002

(54) WATER DILUTABLE BINDERS FOR SOFT FEEL COATING MATERIALS

(75) Inventors: Markus A. Schafheutle, Graz; Anton Arzt, Tillmitsch; Julius Burkl, Graz; Martina Glettler, Graz; Ursula Meisner, Graz; Gerlinde Petritsch, Graz; Joerg Wango, Wundschuh, all of (AT)

(73) Assignee: Solutia Austria GmbH (AT)

( * ) Notice: Subject to any disclaimer, the term of this patent is extended or adjusted under 35 U.S.C. 154(b) by 0 days.

(21) Appl. No.: 09/668,208

(22) Filed: Sep. 22, 2000

(30) Foreign Application Priority Data

Oct. 15, 1999 (AT) .................................................. 1738/99

(51) Int. Cl.$^7$ .............................................. C08L 83/00
(52) U.S. Cl. ........................ 524/589; 524/590; 524/591
(58) Field of Search ................................ 524/589, 590, 524/591

(56) References Cited

U.S. PATENT DOCUMENTS 4,791,168 A    12/1988   Salatin et al.
5,569,707 A    10/1996   Blum et al.

FOREIGN PATENT DOCUMENTS

| EP | 0 590 484 A1 | 4/1994 |
| EP | 0 669 352 A1 | 8/1995 |

Primary Examiner—Edward J. Cain
(74) Attorney, Agent, or Firm—ProPat, L.L.C.

(57) ABSTRACT

Water dilutable binder for soft feel coating materials, comprising an aqueous dispersion of a hydroxyl-containing polyester-urethane A, preparable by reacting a polyester A1 with hydroxyl groups as functional groups, formed from difunctional or polyfunctional carboxylic acids A11 and difunctional or polyfunctional alcohols A12, with a polyfunctional isocyanate A2, with a compound A3 having at least one isocyanate-reactive group and at least one acid group, an aqueous solution or dispersion of a triazine resin B, wherein the glass transition temperature of the polyester-urethane A is between −70 and −20° C. and wherein the hydroxyl number of the polyester-urethane A is from 10 to 120 mg/g, a process for its preparation, and its use in soft feel coating materials for plastics, metals, glass, wood, textiles, and leather.

12 Claims, No Drawings

WATER DILUTABLE BINDERS FOR SOFT FEEL COATING MATERIALS

BACKGROUND OF THE INVENTION

1. Field of the Invention

This invention relates to aqueous binders which can be formulated into coating compositions for any substrates, especially rigid substrates, yielding soft-feel coatings thereon.

2. Descirpition of the Prior Art

In the coating of hard substrates, such as plastics, there is frequently a desire for the coating to achieve a soft feel, where the coated surface, although feeling soft to the touch (like skin or leather), is unimpaired in terms of its mechanical and chemical resistance in comparison to the conventional coatings.

The so-called soft feel coating materials achieve this objective. The substrates coated with them have König pendulum hardnesses of less than 20 seconds for coating films approximately 50 μm in thickness. The surfaces are scratch resistant (scratch test with the fingernail) where scratching leaves a trace, it can be removed again simply by wiping with the fingertip. Without sticking or being tacky, the coated surfaces are slip resistant; for example, a glass or metal block does not slip on a surface coated with a soft feel coating material but instead tips when the angle of inclination is gradually increased. If a coating film is detached from a glass surface coated with it, and its extension is measured, a reversible extension of up to 500% is found on measurement at room temperature with a stretching rate of 0.6 cm/s.

Binders for these soft feel coating materials preferably have segments of polymers having a low glass transition temperature; the crosslinking density must still be high enough for there to be very little or no reduction at all in the mechanical and chemical resistance properties but low enough to allow the effect of the low glass transition temperature to be manifested macroscopically as well.

Two-component, or two-pack binders have been disclosed for soft feel coating materials that are based on hydroxyl-containing polyester-urethanes, which are to be cured preferably with isocyanates but also, for example, with acid anhydrides or amino resins.

It has proven impossible to date to provide practicable one-component, or one-pack binders for soft feel coating materials. Although crosslinking with amino resins may be effected at elevated temperature in the manner of a one-component system, the soft surface of the soft feel coating is adversely affected by the high temperatures required. Especially when coating plastics, the crosslinking temperature is limited by the softening temperature of the polymer substrate.

The known, polyisocyanate-based systems which cure at room temperature share the typical problems of isocyanate-cured systems: the limited pot life and limited acceptability from the standpoint of occupational hygiene. A further important disadvantage of isocyanate curing agents in conjunction with soft feel coating materials is the "aftercuring" which is observed. The polyfunctional isocyanates used for the crosslinking are usually employed in excess. They are able to react with water, or even with the atmospheric moisture, and do so with decarboxylation and formation of the corresponding amines, which in turn form ureas with isocyanates that have not yet reacted. This reaction occurs during the drying of the coating material and adversely affects the feel of the coating film, which is still soft directly following application and initial crosslinking.

There was therefore a need to develop a binder for soft feel coating materials which durably retains this soft feel. A further object was to provide a one-component binder which cures even at moderate temperatures (above 70° C., in particular from about 80 to about 150° C.) and yet imposes very little restriction on the pot life.

This object has been achieved by the provision of a reactive combination comprising a hydroxyl-containing polyester-urethane and a melamine resin.

SUMMARY OF THE INVENTION

The invention accordingly provides a water dilutable binder for soft feel coating materials, comprising an aqueous dispersion of a hydroxyl-containing polyester-urethane A, obtainable by reacting a polyester A1 with hydroxyl groups as functional groups, said polyester A1 having been synthesised from linear, branched or cyclic aliphatic or aromatic difunctional or polyfunctional carboxylic acids A11 and aliphatic linear or branched difunctional or polyfunctional alcohols A12 as reactants, with a polyfunctional isocyanate A2, a compound A3 having at least one hydroxyl, mercapto or amino group which is reactive toward isocyanates and having at least one acid group which reacts only to a minor extent if at all with isocyanates, and also, optionally, with a drying or, preferably, nondrying oil A4, an aqueous solution or dispersion of a triazine resin B which for each molecule derived from a triazine has between 2. and 6 groups selected from methylene groups, methylene ether groups, methylol groups and alkoxymethyl groups, wherein the glass transition temperature of the polyester-urethane A is between −70 and −20° C., preferably from −60 to −25° C., and in particular from −50 to −30° C., and wherein the hydroxyl number of the polyester-urethane A is from 10 to 120 mg/g, preferably from about 20 to about 100, and in particular from 25 to 95 mg/g.

The term "minor extent" as used herein means that, under otherwise identical reaction conditions, the reaction rate of the isocyanate-reactive hydroxyl, mercapto or amino groups is at least 5 times as great as that of the acid groups with respect to the same compound containing isocyanate groups.

DESCRIPTION OF THE PREFERRED EMBODIMENTS

The polyester A1 is prepared preferably in two stages in a known manner by condensing the entirety of the carboxylic acid component A11 with at least a portion A121 of the polyol component A12, the average functionality of A121 in the first stage being between 1.8 and 2.3, preferably from 1.9 to 2.1.

As component A11, it is preferred to use dicarboxylic acids having 4 to 40 carbon atoms, particular preference being given to succinic acid, adipic acid, hexahydrophthalic acid, cyclohexanedicarboxylic acid, and a mixture of branched aliphatic dicarboxylic acids obtainable by dimerising unsaturated fatty acids. Up to 10%, preferably up to 5%, of the mass of A11 may comprise one or more higher carboxylic acids having three or more carboxylic acid groups per molecule, such as tricarboxylic and tetracarboxylic acids.

As component A121, it is preferred to use difunctional alcohols having 2 to 20 carbon atoms. Glycol, 1,2- and 1,3-propanediol, 1,4-butanediol, 1,6-hexanediol, and cyclohexanedimethanol are especially suitable, as are the ether alcohols, diethylene glycol, triethylene glycol and higher oxyethylene diol oligomers up to a degree of polymerisation of approximately 10. It is also possible to use oligomeric propylene glycols; the mass fraction of the ether alcohols in component A121 is preferably up to 30% of the mass of component A121. In the context of the invention it is also possible to use alcohols having a functionality of three or more, and monofunctional alcohols, in each case individually or together, as constituents of component A121. In that case, the amount of these alcohols of higher or lower functionality must be chosen such that the average functionality satisfies the above condition.

Following the condensation of the preferably difunctional reactants of the first stage, the resulting polyester, which typically has an acid number of less than 10 mg/g, preferably less than 5 mg/g, is transesterified with a trifunctional or higher polyfunctional aliphatic alcohol or with a mixture of two or more aliphatic linear or branched alcohols having an average functionality of from 2.2 to 4.5, preferably from 2.5 to 4.0, and in particular from 2.8 to 3.8, referred to collectively below as A122. The component A122 preferably comprises trifunctional alcohols such as glycerol, trimethylolpropane and trimethylolethane, tetrafunctional alcohols such as pentaerythritol, ditrimethylolethane and ditrimethylolpropane, which in accordance with the invention are used preferably in a mixture with difunctional alcohols as defined under A121, and also alcohols of higher functionality such as mannitol, sorbitol and dipentaerythritol. Following the transesterification step, the resultant branched polyester A1 should have a hydroxyl number of from about 50 to about 150 mg/g, preferably from 70 to 130, and in particular from 80 to 120 mg/g, and an acid number of less than 8, in particular less than 5 mg/g.

The polyfunctional isocyanates A2 are aliphatic or aromatic compounds having (on average, where mixtures of two or more compounds are used) two or more than two isocyanate groups per molecule. Suitable aromatic diisocyanates include tolylene diisocyanate (technical-grade mixture of the 2,4- and the 2,6-isomers) and diphenylmethane diisocyanate. Preference is given to linear, branched and cyclic aliphatic isocyanates, especially difunctional isocyanates, having 2 to 15 carbon atoms in the (cyclo) aliphatic radical. Among the aromatic isocyanates, it is also possible to use, preferably, those which carry isocyanate groups on a carbon atom having an aliphatic character; one example thereof is tetramethylxylylene diisocyanate. Other preferred isocyanates are 1,6-diisocyanatohexane, 1,6-diisocyanato-3,3,5- and -3,5,5-trimethylhexane, 1,4-diisocyanatocyclohexane, isophorone diisocyanate, 2,2-bis (4-isocyanatocyclohexyl)propane, and also the uret diones, allophanates and biurets derived therefrom.

The compounds A3 have at least one, preferably two or more, especially two, groups which undergo addition reaction with isocyanates to form urethanes, ureas or thiocarbamates, i.e., hydroxyl, amino, or mercapto groups. As a further functional group they carry an acid group which even under the chosen reaction conditions undergoes little or no reaction with the isocyanate. The acid groups are selected from organically bonded carboxylic, sulfonic and phosphonic acid groups. Preferably, the acid group is sterically shielded by adjacent substituents. Particular preference is given to bishydroxymethylalkanoic acids such as dimethylolpropionic acid, dimethylolbutyric acid, and dimethylolacetic acid.

The oils A4 are the known esters of fatty acids and glycerol, such as linseed oil, and safflower oil; preference is given to nondrying oils, including in particular those in which at least some, preferably more than 5%, of the mass of the fatty acids is also hydroxy-functional. Particular preference is given to castor oil.

Preferably, the polyester-urethane A has an acid number of from about 10 to about 60, with particular preference from about 12 to about 50, and in particular from about 15 to about 40 mg/g, and the acid groups of the polyester-urethane are neutralised to the extent of from 20 to 100%, with particular preference from 30 to 90%, and in particular from 40 to 80%.

The hydroxyl number is defined in accordance with DIN 53 240 as the ratio of that mass $m_{KOH}$ of potassium hydroxide having exactly the same number of hydroxyl groups as a sample under analysis to the mass $m_B$ of this sample (mass of the solid in the sample in the case of solutions or dispersions); its customary unit is "mg/g".

The acid number is defined in accordance with DIN 53 402 as the ratio of that mass $m_{KOH}$ of potassium hydroxide required to neutralise a sample under analysis to the mass $m_B$ of this sample (mass of the solid in the sample in the case of solutions or dispersions); its customary unit is "mg/g".

The resins used as component B are partially or fully etherified triazine resins, derived from melamine, acetoguanamine, caprinoguanamine, and benzoguanamine or their mixtures. For heat-sensitive substrates it is preferred to use melamine resins in which the number of methylol groups in relation to the number of groups which have been etherified or condensed further to methylene, methylene ether or alkoxymethyl groups is sufficient for the reactivity.

Methylol or N-methylol groups are groups of the type >N—CH$_2$OH, methylene groups are groups of the type >N—CH$_2$—N<, methylene ether groups are groups of the type >N—CH$_2$—O—CH$_2$—N<, and alkoxymethyl groups are groups of the type >N—CH$_2$—O—R, where R is usually an alkyl radical selected from methyl, ethyl, n- and iso-propyl and also n-, iso-, sec- and tert-butyl groups, preference being given to methyl and the n- and iso-butyl groups.

Where plastics, textiles, leather or wood are to be coated with the soft feel coating materials of the invention, it is preferred to use those triazine resins which contain predominantly N-methylol groups. Such resins undergo crosslinking reaction with the polyester-urethane even at relatively low temperatures above about 80° C. In the case of the coating of metals or glass, it is also possible to use the slower-reacting etherified melamine resins, with or without the addition of customary acidic catalysts.

Predominantly as used herein means that, in this case, the number of N-methylol groups is higher than the number of any other substituent group, such as methylene, alkoxymethyl, or methylene ether groups, in an amino functionality of the triazine resin.

The amounts of components A and B are advantageously chosen so that the ratio of the number of hydroxyl groups in A to the number of reactive groups in B is from 0.7:1 to 1.5:1, preferably from 0.8:1 to 1.4:1, and with particular preference from 0.9:1 to 1.3:1.

The system of the invention cures, surprisingly, from as low as about 80° C., preferably from about 90° C. Relative to the known systems curable with polyfunctional isocyanates, the systems of the invention have the following advantages:

At approximately equal curing temperature (above 80° C.), the systems of the invention are dust-dry after just a short period (about 0.5 hour) of drying in air; this dust-dry coat may immediately be recoated without the occurrence of the "popping" known with isocyanate-curing systems. In contrast to the isocyanates, the melamine resins in conjunction with the polyester-urethanes are not used in excess; instead, a stoichiometric amount (one methylene, methylol or alkoxymethyl group per hydroxyl group of the polyester-urethane resin) of the melamine resin is sufficient for curing.

At coat thicknesses of as little as above about 30 µm, a soft feel may be obtained with the system of the invention; in the case of the known isocyanate-curing systems, coat thicknesses of at least 50 µm are required. In contrast to the known isocyanate-curing systems, the soft feel coating materials of the invention do not exhibit the phenomenon of aftercuring; the soft feel does not gradually disappear but instead is retained for a long period.

The binders of the invention are outstandingly suitable for the formulation of coating materials which give the substrates coated with them the above-described soft feel. They are used in particular to coat metals, plastics, glass, ceramic, textiles, leather, and wood.

EXAMPLES

1 Polyester 11 kg of diethylene glycol, 18 kg of 1,4-butanediol, 16.4 kg of ethylene glycol and 72 kg of adipic acid were mixed, and 0.13 kg of dibutyltin oxide was added. This mixture was heated with stirring to 220° C. over the course of 6 hours and the water of condensation formed was distilled off on a column. When the overhead column temperature fell, at maximum product temperature, distillation was continued at 220° C., with the pressure falling, until the acid number had dropped below 2 mg/g. Following measurement of the hydroxyl number, ethylene glycol was added in an amount such that the subsequent transesterification at 220° C. gave an OH number of from 48 to 52 mg/g. This corresponds to a viscosity of the undiluted resin at 23° C. of from 10,140 to 11,980 mpa·s. Subsequently, 3.5 kg of trimethylolpropane and 0.24 kg of ethylene glycol were added to 98.39 kg of this precondensate. This mixture was held at 220° C. for a further hour. This gave a polyester having an acid number of less than 3 mg/g and an OH number of approximately 90 mg/g (number-average molar mass $M_n$ approximately 1250 g/mol).

2 Polyurethane Dispersion 2.1 OH-functions in the Side Chain 102.2 kg (81.8 mol) of the polyester from Example 1 were mixed with 7.3 kg (7.8 mol) of castor oil, 6.2 kg (46.2 mol) of dimethylolpropionic acid and 33 kg of N-methylpyrrolidone and the mixture was stirred at 60° C. until it had become a clear solution. The mixture was then diluted with 59 kg of methyl isobutyl ketone and 34 kg (202.1 mol) of hexamethylene diisocyanate were added at 40° C. The mixture was held at this temperature until the isocyanate concentration (mass content, based on the mass of the solid resin) was 2.1%. When this value had been reached, the resin was added over the course of 10 minutes to a solution, heated at 80° C., of 3.3 kg (37.4 mol) of dimethylethanolamine in 200 kg of deionised water and was incorporated by stirring. Immediately thereafter, a solution of 5.1 kg (83.5 mol) of ethanolamine in 49 kg of deionised water was added to this mixture over the course of 5 minutes. Following a subsequent stirring phase of 30 minutes, the dispersion Was cooled to 50° C. and the methyl isobutyl ketone Was distilled off under falling pressure. This gave a polyurethane dispersion having a mass fraction of solids (nonvolatile fraction) of 35%, a pH of about 7.7, a viscosity of about 570 mpa·s and a particle size of from about 110 to 140 nm.

2.2 Flexibilised and OH Functions at the Chain End 102.2 kg of the polyester from Example 1 were mixed with 7.3 kg of castor oil, 6.2 kg of dimethylolpropionic acid and 33 kg of N-methylpyrrolidone and the mixture was stirred at 60° C. until it had become a clear solution. The mixture was then diluted with 59 kg of methyl isobutyl ketone and 34 kg of hexamethylene diisocyanate were added at 40° C. The mixture was held at this temperature until the isocyanate concentration (mass of isocyanate groups, based on the mass of the solid resin) was 2.1%. When this value had been reached, the resin was added over the course of 10 minutes to a solution, heated at 80° C., of 3.3 kg of dimethylethanolamine in 249 kg of deionised water and was incorporated by stirring. Immediately thereafter, a mixture of 3.2 kg of diethanolamine and 5.8 kg of 2-ethylhexylamine was added to this mixture over the course of 5 minutes. Following a subsequent stirring phase of 30 minutes, the dispersion was cooled to 50° C. and the methyl isobutyl ketone was distilled off under falling pressure. This gave a polyurethane dispersion having a mass fraction of solids (nonvolatile fraction) of 40%, a pH of about 7.7, a viscosity of about 850 mPa·s and a particle size of from about 130 to 160 nm.

3 Soft Feel Coating Materials 3.1 5 g of ®Additol VXL 6208 (Vianova Resins GmbH & Co.

KG) and 3 g of ®Entschäumer DNE (Bayer AG; defoamer) were added to 286 g of the binder from Example 2.1, and stirred in. During stirring, 64 g of deionised water were added slowly. 5 g of ®Spezialschwarz 4 (Degussa-Hüls AG; black pigment) were added to this homogeneous mixture and incorporated in a bead mill. After 20 minutes, 15 g of ®TS100 (Degussa-Hüls AG) were added successively with the bead mill running. Thereafter, dispersion was continued for a further 10 minutes. The beads were removed by sieving and, in a paddle stirrer, 3 g of ®Byk 346 (Byk Chemie GmbH; wetting agent) and 1 g of ®Entschäumer DNE were incorporated.

3.2 5 g of ®Additol VXL 6208 and 3 g of ®Entschäumer DNE were added to 250 g of the binder from Example 2.2, and stirred in. During stirring, 100 g of deionised water were added slowly. 5 g of ®Spezialschwarz 4 were added to this homogeneous mixture and incorporated in a bead mill. After 20 minutes, 15 g of ®TS100 were added successively with the bead mill running. Thereafter, dispersion was continued for a further 10 minutes. The beads were removed by sieving and, in a paddle stirrer, 3 g of ®Byk 346 and 1 g of ®Entsch äumer DNE were incorporated.

4 Application 4.1 2.5 g of the melamine resins ®Cymel 385 (examples 4.11 C and 4.12 C) and, respectively, ®Maprenal MF 920 (4.11 M and 4.12 M) were stirred into 100 g of these coating materials (3.1 and 3.2).

These coating materials admixed with the curing agent were drawn down onto an ABS sheet using a drawing cube with a gap width of 300 mm. After being left to evaporate in air at room temperature for 5 minutes, the coated sheets were subjected to forced drying at 90° C. for 30 minutes. This gave soft feel coatings with pleasant sensory qualities (feel) and very good solvent and chemical resistance. Coatings in accordance with 4.12 with binders in accordance with Example 2.2 (coating materials 3.2) are somewhat softer in feel and of higher elasticity than those in accordance with 4.11 with binders in accordance with Example 2.1 (coating materials 3.1).

The elongation of a cured film (drawn down onto glass plates and detached, wet film thickness approximately 300 µm) was more than 400% on curing at 90° C. (4.11 C), and more than 300% on curing at approximately 150° C. (4.11 M).

4.2 5 g of the melamine resins ®Cymel 385 (4.21 C and 4.22 C) and, respectively, ®Maprenal MF 920 (4.21 M and 4.22 M) were stirred into 100 g of the coating materials (3.1 and 3.2).

These coating materials admixed with the curing agent were drawn down onto an ABS sheet using a drawing cube with a gap width of 300 mm. After being left to evaporate in air at room temperature for 5 minutes, the coated sheets were subjected to forced drying at 90° C. for 30 minutes. This gave soft feel coatings with pleasant sensory qualities and very good solvent and chemical resistance. coatings in accordance with 4.22 with binders in accordance with Example 2.2 (coating materials 3.2) are somewhat softer in feel and of higher elasticity than those in accordance with 4.21 with binders in accordance with Example 2.1 (coating materials 3.1).

What is claimed is:

1. A water dilutable one-pack binder for soft feel coating materials, comprising an aqueous dispersion of a hydroxyl-containing polyester-urethane A, obtained by reacting a polyester A1 with hydroxyl groups as functional groups, said polyester A1 having been synthesised from linear, branched or cyclic aliphatic or aromatic difunctional or polyfunctional carboxylic acids A11 and aliphatic linear or branched difunctional or polyfunctional alcohols A12 as reactants, with a polyfunctional isocyanate A2, a compound A3 having at least one hydroxyl, mercapto or amino group which is reactive toward isocyanates and having at least one acid group which reacts only to a minor extent if at all with isocyanates, and also, optionally, with a drying or, preferably, nondrying oil A4, an aqueous solution or dispersion of a triazine resin B which for each molecule derived from a triazine has between 2 and 6 groups selected from methylene groups, methylene ether groups, methylol groups and alkoxymethyl groups, wherein the glass transition temperature of the polyester-urethane A is between −70 and −20° C., and wherein the hydroxyl number of the polyester-urethane A is from 10 to 120 mg/g.

2. The water dilutable binder for soft feel coating materials as claimed in claim 1, wherein the polyester-urethane A has an acid number of from 10 to 60 mg/g.

3. The water dilutable binder for soft feel coating materials as claimed in claim 1, wherein dicarboxylic acids having 4 to 40 carbon atoms are used as component A11.

4. The water dilutable binder for soft feel coating materials as claimed in claim 1, wherein up to 10% of the mass of component A11 comprises carboxylic acids having three or more carboxylic acid groups per molecule.

5. The water dilutable binder for soft feel coating materials as claimed in claim 1, wherein the polyester A1 is prepared in two stages and wherein in the first stage the entirety of the carboxylic acid component A11 is reacted with a portion A121 of component A12, the average functionality of component A121 being between 1.8 and 2.3.

6. The water dilutable binder for soft feel coating materials as claimed in claim 5, wherein in the second stage the polyester prepared in the first stage is reacted with a trifunctional or higher polyfunctional aliphatic alcohol or with a mixture of two or more aliphatic linear or branched alcohols having an average functionality of from 2.2 to 4.5.

7. The water dilutable binder for soft feel coating materials as claimed in claim 1, wherein the isocyanates A2 are selected from aliphatic linear, branched and cyclic diisocyanates having 2 to 15 carbon atoms in the (cyclo)aliphatic radical.

8. The water dilutable binder for soft feel coating materials as claimed in claim 1, wherein dimethylolbutyric, dimethylolpropionic or dimethylolacetic acid is used as compound A3.

9. The water dilutable binder for soft feel coating materials as claimed in claim 1, wherein linseed oil, safflower oil or castor oil is used as oil A4.

10. The water dilutable binder for soft feel coating materials as claimed in claim 1, wherein melamine resins having a ratio of the sum of the number of methylene, methylene ether and alkoxymethyl groups to the sum of the number of N-methylol, methylene, methylene ether and alkoxymethyl groups of from 0.1 to 0.95 are used as triazine resins B.

11. A soft feel coating material comprising a binder as claimed in claim 1.

12. A method of use of a soft feel coating material as claimed in claim 11, comprising applying the said soft feel coating material on one or more of wood, textiles, leather, metals, glass, and plastics.

* * * * *